United States Patent
Philbin et al.

(10) Patent No.: US 10,997,645 B1
(45) Date of Patent: May 4, 2021

(54) OPTIMIZED PRODUCT PREPARATION

(71) Applicant: Wells Fargo Bank, N.A., San Francisco, CA (US)

(72) Inventors: Steven Matthew Philbin, Fort Myers, FL (US); John Edward Cronin, Bonita Springs, FL (US)

(73) Assignee: Wells Fargo Bank, N.A., San Francisco, CA (US)

(*) Notice: Subject to any disclaimer, the term of this patent is extended or adjusted under 35 U.S.C. 154(b) by 766 days.

(21) Appl. No.: 15/062,986

(22) Filed: Mar. 7, 2016

(51) Int. Cl.
*G06Q 30/06* (2012.01)
*G01S 19/52* (2010.01)

(52) U.S. Cl.
CPC .......... *G06Q 30/0635* (2013.01); *G01S 19/52* (2013.01)

(58) Field of Classification Search
None
See application file for complete search history.

(56) References Cited

U.S. PATENT DOCUMENTS

| | | | | |
|---|---|---|---|---|
| 2001/0051885 | A1* | 12/2001 | Nardulli | G06Q 10/02 705/6 |
| 2012/0173257 | A1 | 7/2012 | Preiss et al. | |
| 2013/0030955 | A1* | 1/2013 | David | G06Q 10/08 705/26.8 |
| 2013/0080280 | A1* | 3/2013 | Scipioni | G06Q 10/06 705/26.1 |
| 2014/0149241 | A1 | 5/2014 | Neuneker et al. | |
| 2014/0164046 | A1* | 6/2014 | Haralambos | G06Q 30/06 705/7.25 |
| 2014/0257877 | A1 | 9/2014 | L'Heureux et al. | |
| 2014/0279081 | A1* | 9/2014 | Marx | G06Q 30/0601 705/15 |
| 2014/0279270 | A1 | 9/2014 | Bertanzetti et al. | |
| 2014/0358724 | A1* | 12/2014 | Nallu | G01C 21/3682 705/26.8 |
| 2016/0247113 | A1* | 8/2016 | Rademaker | G06Q 10/063114 |
| 2017/0251340 | A1* | 8/2017 | Sanders | H04W 4/02 |

OTHER PUBLICATIONS

Cheong, Soon Nyean, Wei Wing Chiew, and Wen Jiun Yap. "Design and development of multi-touchable e-restaurant management system." 2010 International Conference on Science and Social Research (CSSR 2010). IEEE, 2010 (Year: 2010).*
Allset Technologies Inc, Order Sit-Down Lunches at Restaurants, iTunes Preview, Mar. 1, 2016, 2 pages.
Advice Wallet, Settle—Pre-order food to dine at restaurants, iTunes Preview, May 4, 2015, 3 pages.
Rushorder, RushOrder Overview, downloaded Mar. 7, 2016, 5 pages.
Skip, Online pre-order and payment for cafes, restaurants and bars, 2014, 6 pages.

(Continued)

*Primary Examiner* — Michelle T Kringen
(74) *Attorney, Agent, or Firm* — Merchant & Gould P.C.

(57) ABSTRACT

A method implemented for managing a merchant queue includes receiving order data associated with a placed order and user data for a user from a user device. User characteristics are determined based on historical data associated with the user. A placement of the placed order in a production queue is determined based on the order data and the user characteristics. A time at which the placed order is estimated to be ready is permitted to change based on changes to the user data.

13 Claims, 20 Drawing Sheets

(56) References Cited

OTHER PUBLICATIONS

Starbucks Coffee Company, Starbucks on the App Store, iTunes Preview, Jan. 19, 2016, 4 pages.
Taco Bell Corp., MobileApp—Taco Bell, 2016, 5 pages.
Wright, Matt, Pre-Order System | Square Pickup, accessed by archive.org on Oct. 17, 2015, 2 pages.
Lawler, Ryan, Square's Order App Can Now Predict When You'll Arrive To Pick Up Your Cappuccino, Oct. 8, 2014, 2 pages.

\* cited by examiner

| User ID | Name | Item | Qty | Lty | ETA | User Dvc Clock | Habit | Ready By | New ETA | Store | User GPS | Store GPS | Trans. Method |
|---|---|---|---|---|---|---|---|---|---|---|---|---|---|
| 007JB | John Doe | Meatball Sub | 1 | 3 | 12:35PM | 12:29PM | +5 min. | 12:40PM | 12:35PM | Sandwich Hut; 12 Main Street | Xx1:yy1 | Xx5:yy5 | Walk |
| 239UR | Susie Lee | Chicken Wrap | 2 | 2 | 12:40PM | 12:30PM | -2 min. | 12:38PM | 12:40PM | Sandwich Hut; 12 Main Street | Xx2:yy2 | Xx5:yy5 | Bus |
| 79RJ3 | Bob Johnson | BLT | 1 | 1 | 12:38PM | 12:31PM | +3 min. | 12:41PM | 12:38PM | Sandwich Hut; 12 Main Street | Xx3:yy3 | Xx5:yy5 | Car |
| 2387L | Ally Smith | Turkey Wrap | 1 | 2 | 12:42PM | 12:32PM | +1 min. | 12:43PM | 12:42PM | Sandwich Hut; 12 Main Street | Xx4:yy4 | Xx5:yy5 | Walk |

FIG. 7

OPTIMIZED PRODUCT PREPARATION

BACKGROUND

Customers who need to pick up an order at a merchant store typically like the order to be ready when they arrive at the merchant store and not have to wait for the order. Merchants typically also prefer to have orders ready when customers arrive so that the customers do not have to wait for the orders.

When an order includes multiple items, merchants typically prefer to know in advance when the customer will arrive at the merchant store so that a merchant can determine logistics for procuring the multiple items. In addition, when orders contain perishable items such as food, in addition to trying to have an order ready when the customer arrives, it is desirable not to have the order ready too soon to avoid having the order become cold or stale when the customers arrive.

SUMMARY

Embodiments of the disclosure are directed to a method implemented on an electronic computing device for managing a merchant queue comprising: on the electronic computing device, receiving order data associated with a placed order and user data for a user from a user device; determining user characteristics based on historical data associated with the user; determining a placement of the placed order in a production queue based on the order data and the user characteristics; and permitting a time at which the placed order is estimated to be ready to change based on changes to the user data.

In another aspect, a method implemented on an electronic computing device for processing an order at a merchant store comprises: on the electronic computing device, receiving order data and user data from a user device; identifying a user associated with the order; determining user characteristics based on historical data; using the order data, the user data and the user characteristics, determining a time at which a user order based on the order data is estimated to be ready, so that the time at which the user order is estimated to be ready is approximately the same as a time of an estimated time of arrival for the user at the merchant store; and permitting the time at which the user order is estimated to be ready to change based on the changes to the user data.

In yet another aspect, an electronic computing device includes a processing unit; and system memory, the system memory including instructions which, when executed by the processing unit, cause the electronic computing device to: receive order data and user data for a user from a mobile electronic computing device, the order data including a first identifier for a product to be ordered at a merchant store, the user data including a second identifier for the user, a current location for the user, a method of transportation for the user to travel to the merchant store and a current time from the mobile electronic computing device; identify the user associated with the order data; determine characteristics of the user based on historical ordering data for the user, the user characteristics including a classification representing how often the user orders from the merchant store and a value representing a number of minutes the user is on average early or late when picking up an order at the merchant store; determine a current distance of the user to the merchant store; determine an average speed of the user when traveling to the merchant store, the average speed being based on the method of transportation for the user; using the current distance of the user to the merchant store, the average speed of the user and the current time from the mobile electronic computing device, calculate an estimated time of arrival at the merchant store for the user; using the order data, the user data, the estimated time of arrival at the merchant store for the user, and the number of minutes the user is on average early or late when picking up orders at the merchant store, determine a time at which a user order based on the order data is estimated to be ready, so that the time at which the user order is estimated to be ready is approximately the same as a time at which the user is estimated to arrive at the merchant store; receive changes to the current location of the user; calculate an updated estimated arrival time for the user at the merchant store based on the current location of the user; and display a graphical user interface on a display area of the electronic computing device showing the time at which the order is estimated to be ready and the updated estimated arrival time for the user, wherein the graphical user interface permits the time at which the user order is estimated to be ready to be changed.

The details of one or more techniques are set forth in the accompanying drawings and the description below. Other features, objects, and advantages of these techniques will be apparent from the description, drawings, and claims.

DESCRIPTION OF THE DRAWINGS

FIG. 7 shows an example incoming customer database.

DETAILED DESCRIPTION

Figure 1:
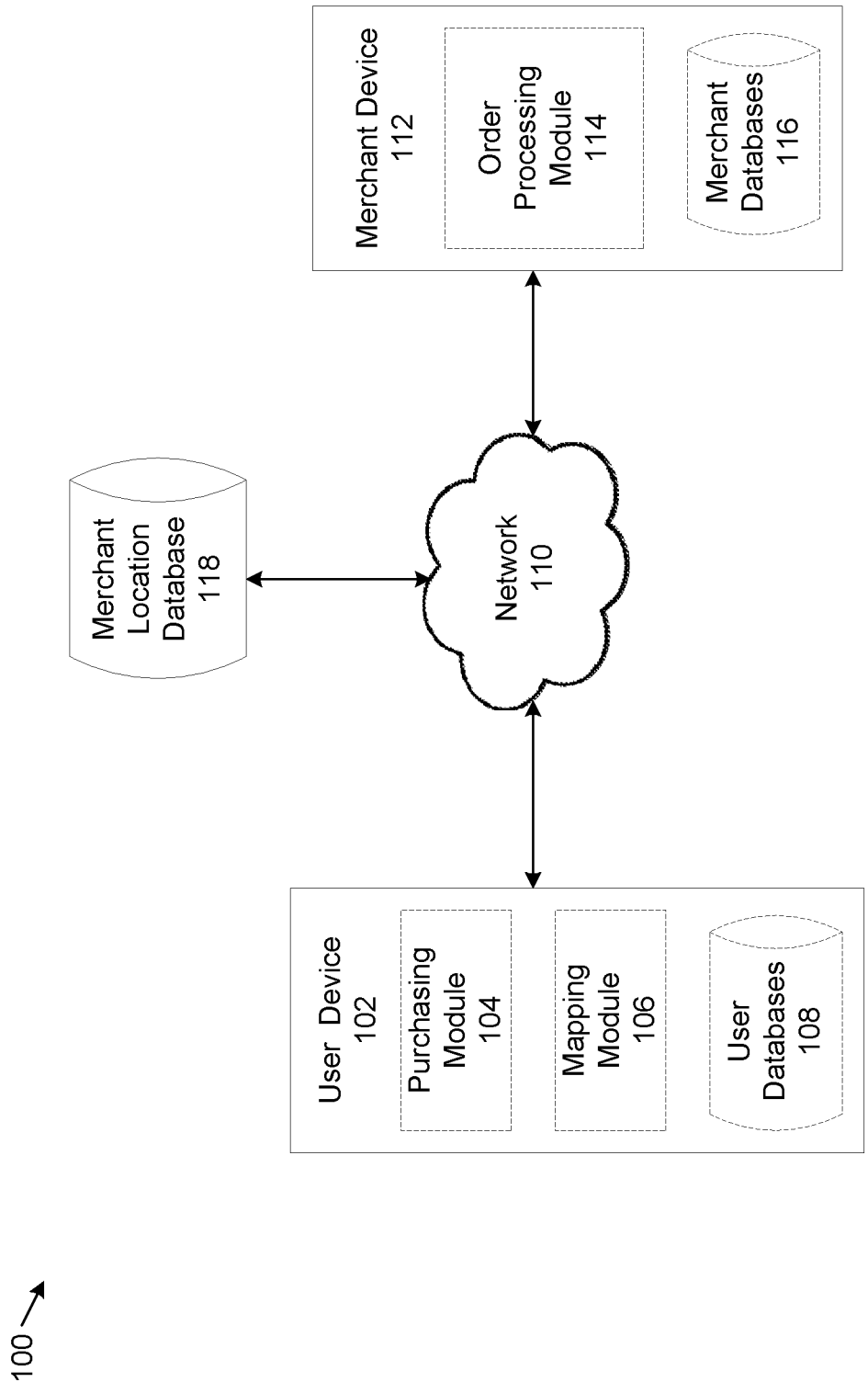
FIG. 1 shows an example system that supports optimized product preparation.

The present disclosure is directed to systems and methods that can be used for optimized product preparation. Using the systems and methods, a customer can use a smartphone or other mobile electronic computing device to place an order for a product or service at a merchant store. An employee at the merchant store can use stored customer characteristics and a current location for the customer to determine when the customer should arrive at the merchant store to pick up the order. The customer characteristics can be obtained from one or more customer databases. The current location for the customer can be obtained using global position system (GPS) software on the smartphone. Other similar parameters can also be examined.

The merchant can then determine when to start preparation of the order so that the order is ready at approximately a time at which the customer is scheduled to arrive at the merchant store. In addition, the merchant can obtain updates to a current location of the customer as the customer is traveling to the merchant store, determine whether there will be a change (e.g., speed up or delay) in the estimated customer arrival time and adjust the preparation for the order so that the order is ready when the user arrives at the merchant store. Adjusting preparation of an order so that the order is ready at approximately a time when the user arrives at the merchant store is a method of product preparation optimization commonly known as just-in-time product preparation.

The systems and methods can be used for any order in which preparation is required. For example, the systems and methods can be used for managing a merchant queue for processing orders. A time of an order placed in a production queue can be determined from received user data and user characteristics. The user characteristics, such as a loyalty classification for the user and a reliability measure for the user, can be obtained from historical data. For example, in addition to food preparation, such as a fast-food restaurant, the systems and methods can be used in an inventory control system in which an order can be filled from one or more components in inventory.

The systems and methods disclosed herein are directed to a computer technology that solves an existing problem in preparation logistics at a merchant store. The systems and methods permit the preparation logistics to be adjusted based on a determination of when a customer is estimated to actually arrive at the merchant store to pick up an order. In addition, because a location of the customer on a travel route to the merchant store can be monitored, an alert can be generated when a determination is made that the customer will arrive at least 5 minutes later than expected. The alert can permit the merchant store to adjust a time at which the order will be ready. Such a configuration results in a more efficient logistics system for the merchant.

This can be important, for example, in a scenario in which the merchant handles a complex inventory and/or a significant number of orders. In these situations, the system can provide an efficient solution to managing the orders. This results in a system that is more efficient at managing and providing order fulfillment at desired times and at desired levels.

FIG. 1 shows an example system 100 that supports optimized product preparation. The system 100 includes a user device 102, a merchant location database 118, a merchant device 112 and a network 110. The user device 102 includes a purchasing module 104, a mapping module 106 and user databases 108. The merchant device 112 includes an order processing module 114 and merchant databases 116. More, fewer or different components are possible.

The example user device 102 is a mobile electronic computing device such as a smartphone or tablet computer. The user device 102 includes a software application that can be used to place an order at a merchant store. As discussed in more detail later herein, the software application includes a purchasing graphical user interface (GUI) from which the user can place an order and a transportation method GUI from which the user can choose a method of transportation to the merchant store. In this application the terms user and customer are used interchangeably.

The example purchasing module 104 processes orders placed using the purchasing GUI and saves the order in one of user databases 108, a user device order database. The order includes an identifier for the merchant store at which the order is to be placed, an identifier for an item to be purchased, a quantity of the item to be purchased, and a name of the customer placing the order. After the order is placed, the purchasing module 104 activates the transportation method GUI and permits the customer to select a method of transportation to the merchant store. The method of transportation can be one of walk, bike, bus, subway or car. The purchasing module 104 saves the method of transportation in another of user databases 108, a user device routing database.

The example mapping module 106 obtains a current GPS location for the customer and a current device clock reading from the customer's smartphone and saves the current GPS location and the current device clock reading to the user device routing database. The mapping module 106 obtains a GPS location of the merchant store from the merchant location database 118 and determines a route for the customer to the merchant store. Based on the route, the current location of the customer and the current time, the mapping module 106 determines an estimated time of arrival (ETA) for the customer at the merchant store. The ETA for the customer is saved in the user device routing database.

The example network 110 is a computer network that can permit communication between one or more of user device 102, merchant device 112 and merchant location database 118. Network 110 can include one or more of a corporate network and the Internet.

The example merchant location database 118 is a database that includes GPS coordinates of merchant stores. The merchant stores are retail stores in a local geographical area of the customer.

The example merchant device 112 is an electronic computing device at the merchant store. The merchant device 112 includes the order processing module 114 and the merchant databases 116.

The example order processing module 114 processes incoming orders, calculates an estimated time of arrival for the customer at the merchant store, schedules a processing of the order and a time at which the order will be ready, tracks a current location of the customer and adjusts the processing of the order and the time at which the order will be ready based on any delays the customer experiences in traveling to the merchant store. The order processing module 114 is discussed in more detail later herein.

The example merchant databases 116 include internal databases on the merchant device 112 for such items as order holding, order queue, customer loyalty, customer ordering history and customer tracking. The merchant databases 116 are discussed in more detail later herein.

Figure 2:
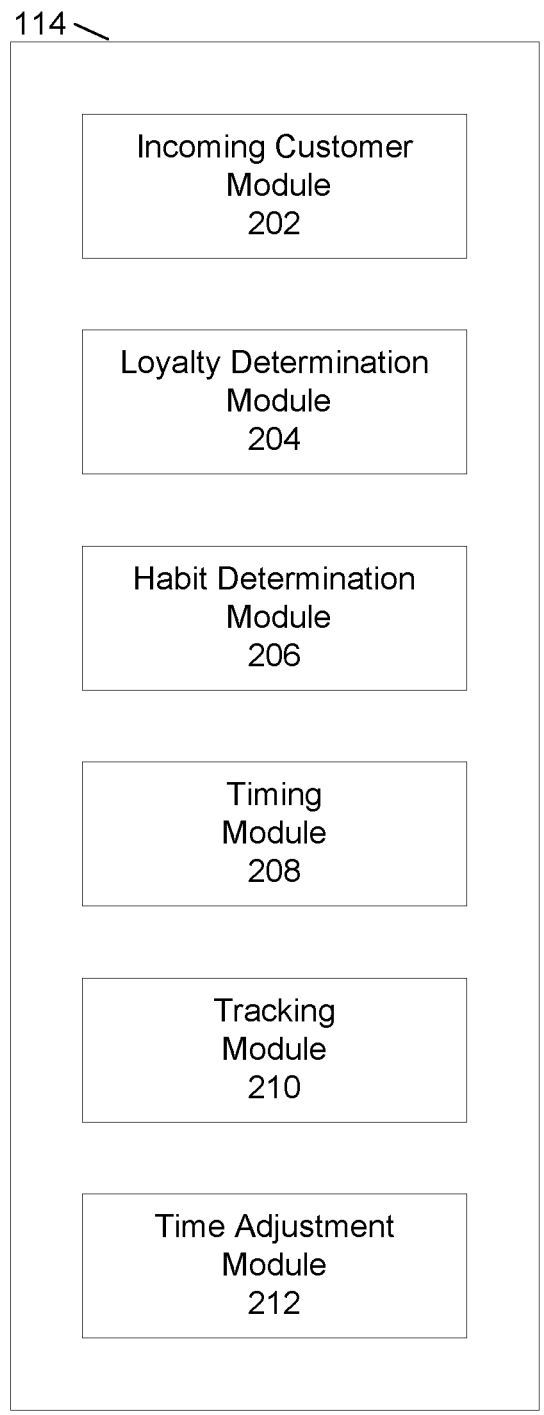
FIG. 2 shows example modules of the order processing module of FIG. 1.

FIG. 2 shows example modules for the order processing module 114. The example modules include an incoming customer module 202, a loyalty determination module 204, a habit determination module 206, a timing module 208, a tracking module 210 and a time adjustment module 212.

The example incoming customer module 202 processes information regarding the customer after an order is received at the merchant device 112. The processing of the information includes a determination as to whether this is a new customer or returning customer, accessing a loyalty database to determine of a loyalty classification for the customer and accessing an incoming customer database to determine whether the customer is habitually early or late when arriving at the merchant store to pick up an order.

The example loyalty determination module 204 assigns the loyalty classification to the customer. The loyalty classification, known as a loyalty level, is a numerical value representing how often the customer has ordered from the merchant store. A new customer is assigned a loyalty level of zero. As discussed in more detail later herein, in an example implementation loyalty levels can range from zero to five. The loyalty level is stored in the loyalty database.

The example habit determination module 206 determines whether on average the customer arrives early or late at the merchant store compared with the estimated time of arrival for the customer. The average time for which the customer arrives early or late is saved at a habit for the customer in the incoming customer database.

The example timing module 208 displays a merchant GUI (see FIG. 5) on a display screen of merchant device 112. The timing module 208 continually polls a Place Order button on the merchant GUI to determine when an order has been placed. The timing module 208 also determines whether the merchant GUI indicates that there is a delay for the order (for example when a determination is made that the customer will be late in arriving). When there is not a delay, timing module 208 initiates the sending of a "Ready by" message to the user device 102. The "Ready by" message informs the customer when the order is scheduled to be ready. When there is a delay, the timing module 208 starts a timer and timer readings are taken until a delay time has been reached. When the delay time has been reached, the timing module 208 initiates the sending of the "Ready by" message to the user device 102.

The example tracking module 210 receives a current GPS location of the user device 102 and calculates an updated estimated time of arrival for the customer at the merchant store. The updated estimated time of arrival permits time adjustment module 212 to notify the merchant store of changes in when the customer is expected to arrive at the merchant store.

The example time adjustment module 212 compares a current estimated time of arrival for the customer with the updated estimated time of arrival. When a difference between the current estimated time of arrival and the updated estimated time of arrival is greater or equal to five minutes, the time adjustment module 212 displays a time adjustment GUI (see FIG. 6), on the display screen of merchant device 112. The time adjustment GUI permits an employee at the merchant store to see the updated estimated time and adjust the "Ready by" time. In some implementations, the display of the time adjustment GUI can comprise an alert that the user has been delayed and that a time adjustment may be needed. In other implementations, in addition to the display of the time adjustment GUI, the time adjustment module 212 can generate an audible alert at the merchant device 112.

Figure 3:
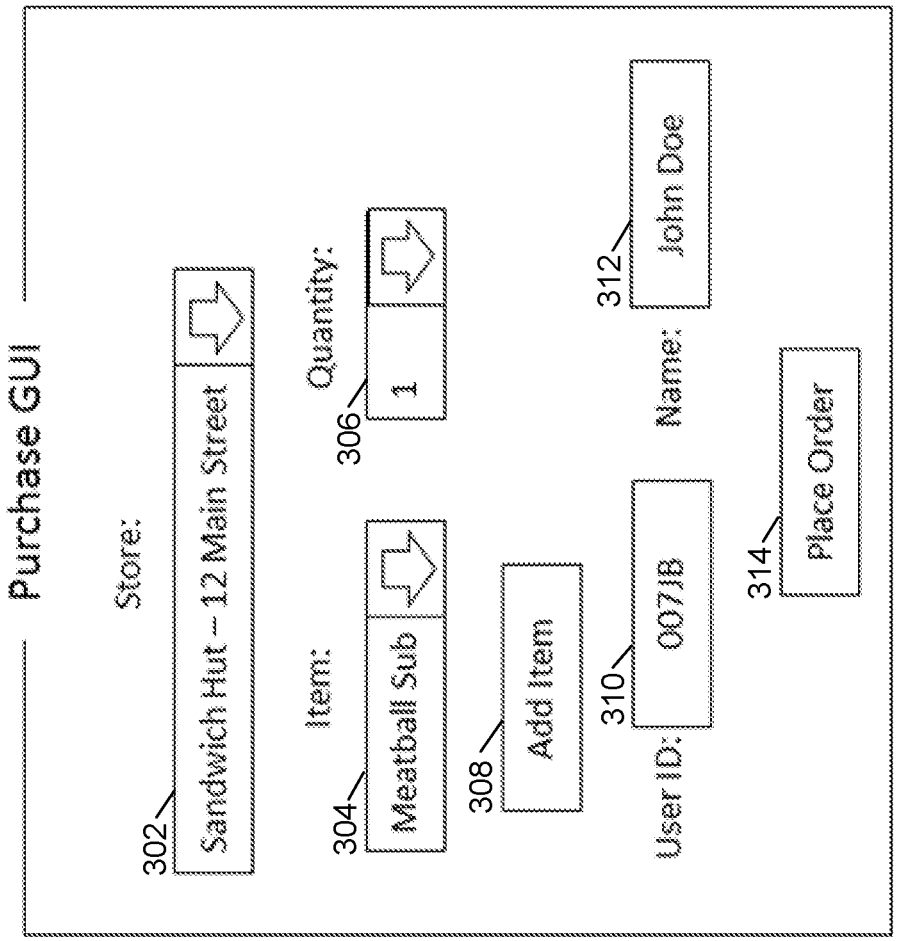
FIG. 3 shows an example graphical user interface (GUI) depicting a purchase GUI.

FIG. 3 shows an example purchase GUI 300. The purchase GUI 300 is displayed on the user device 102 when the customer decides to place an order for a product. The purchase GUI includes an example Store drop down list box 302, whereby the customer can scroll a list of available merchant stores and select a merchant store from which to place an order. The example Item drop down list box 304 permits the customer to scroll a list of available items to purchase at the selected merchant store. The example Quantity drop down list box 306 permits the customer to select a quantity of the selected item to order. The example Add Item edit box 308 permits the customer to add additional items to their order. Additional items can include side orders such as chips and drinks. The example User ID edit box 310 permits the customer to enter an ID that can identify the customer at the merchant store and the example Name edit box 312 permits the customer enter the customer's name. When the customer is ready to order, the customer can select the Place Order button 314 to place an order for the selected item at the selected merchant store.

Figure 4:
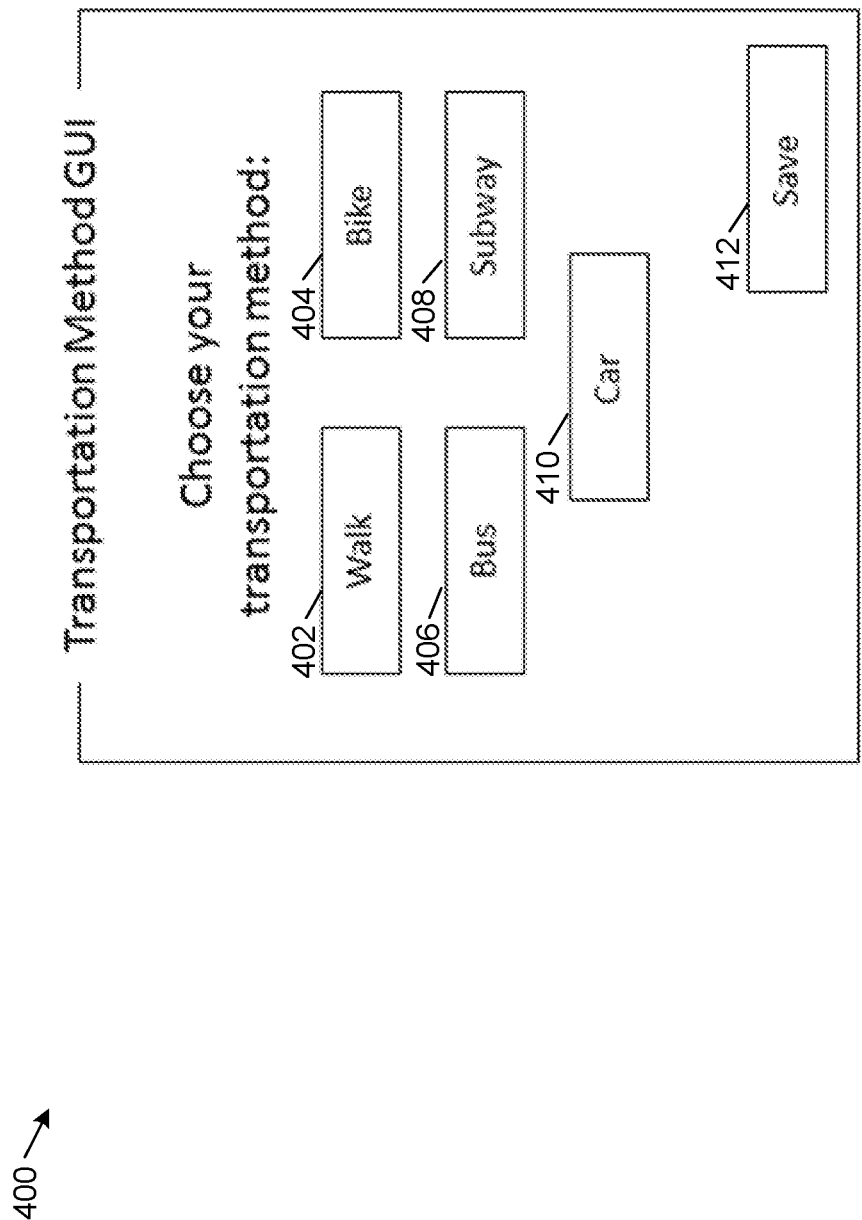
FIG. 4 shows an example graphical user interface depicting a transportation method GUI.

FIG. 4 shows an example transportation method GUI 400. The transportation method GUI 400 is displayed after the customer places an order via the place order button 314. The transportation method GUI includes buttons for Walk 402, Bike 404, Bus 406, Subway 408 and Car 410. The customer can select a method of transportation by selecting one of these buttons. After the customer selects the method of transportation, the customer can select the Save button 412 to save the selected method of transportation. After the customer selects the Save button 412, the order data from the purchase GUI 300 and the selected transportation method from the transportation method GUI 400 can be sent to the merchant device 112.

Figure 5:
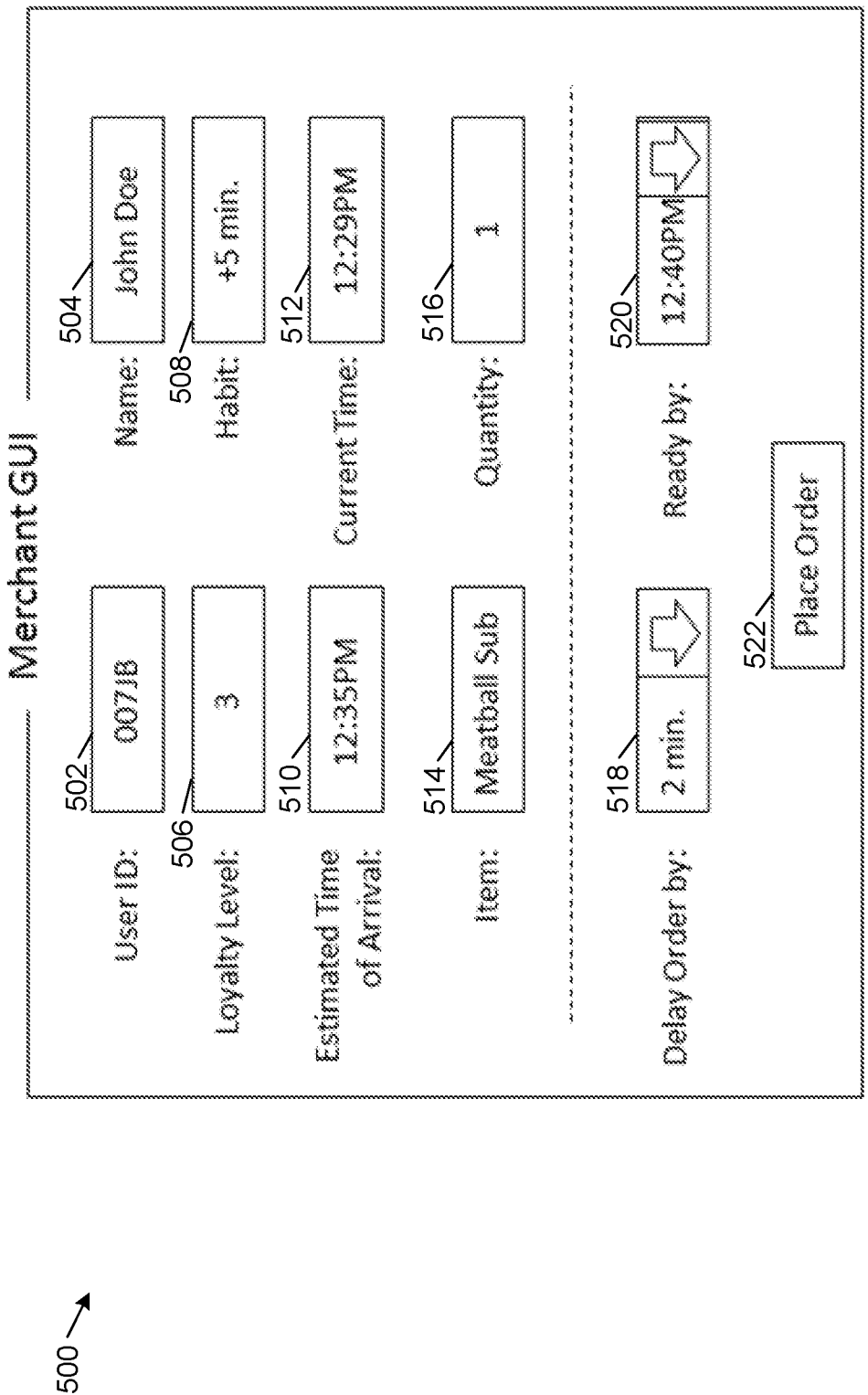
FIG. 5 shows an example graphical user interface depicting a merchant GUI.

FIG. 5 shows an example merchant GUI 500. The merchant GUI 500 is displayed when the order processing module 114 processes an order at the merchant device 112. The merchant GUI is populated with a received User ID 502 and customer Name 504, a Loyalty Level 506, a Habit 508 representing an average time in which the customer is typically early or late when picking up an order, an Estimated Time of Arrival 510, a Current Time 512, a Name of an item to be ordered 514 and a Quantity 516 of the item to be ordered. Based on this displayed information, the merchant can delay an order by a selectable number of minutes using the Delay Order by pull-down list box 518. The merchant can also select a new ready by time using the Ready by pull-down list box 520. The merchant can then place the order by selecting the Place Order button 522.

Figure 6:
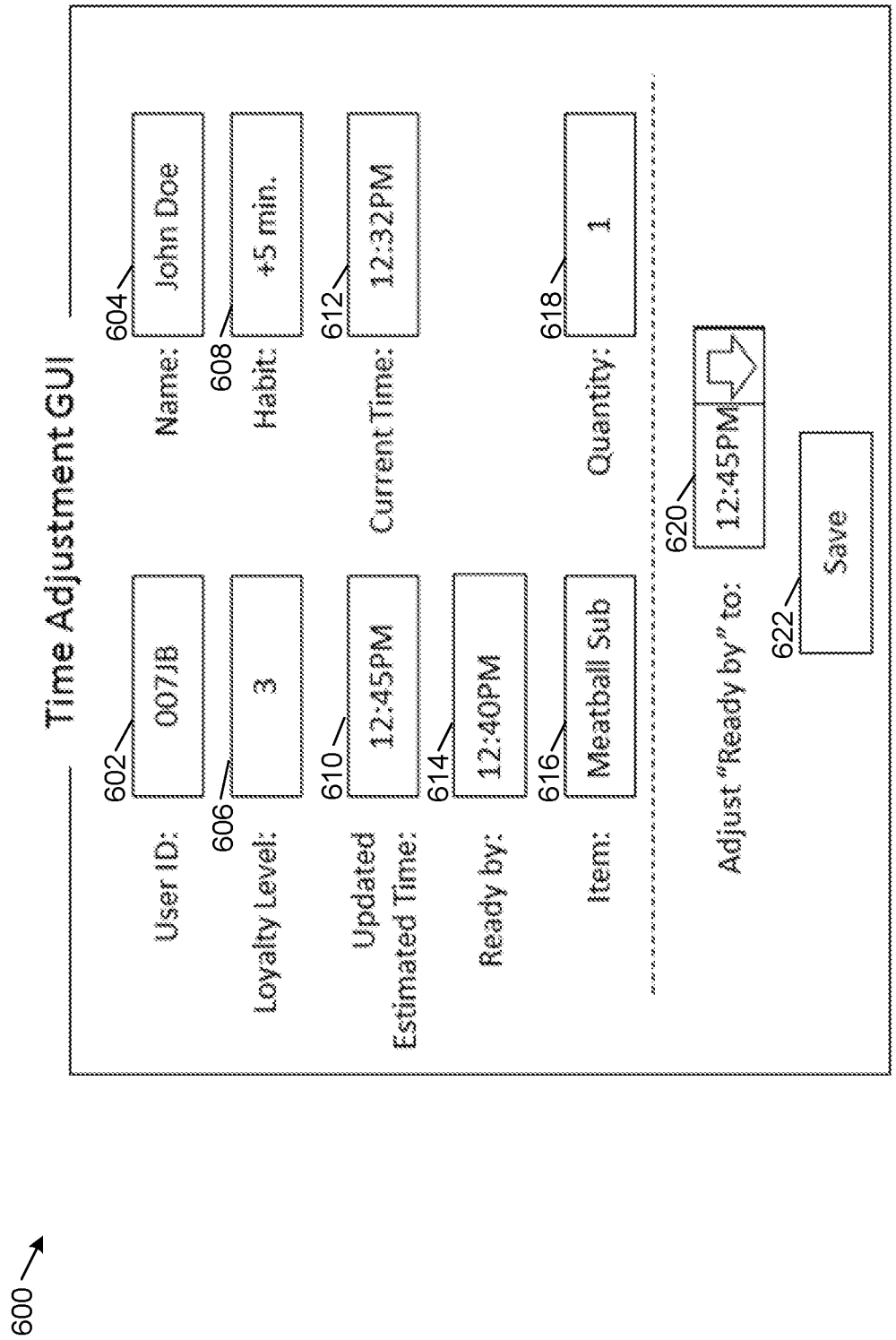
FIG. 6 shows an example graphical user interface depicting a time adjustment GUI.

FIG. 6 shows an example time adjustment GUI 600. The time adjustment GUI 600 is displayed when the time adjustment module 212 determines that a difference between the estimated time of arrival and the updated estimated time of arrival is greater or equal than five minutes. The time adjustment GUI 600 displays the User ID 602, the Customer name 604, the Loyalty Level 606, the Habit 608, the Updated Estimated Time 610, the Current Time 612, the Ready by time 614 the Item 616 that is ordered and the Quantity 618 of the item that is ordered. The time adjustment GUI 600 also includes an Adjust "Ready by" to pull-down list box 620 and a Save button 622. The merchant can use the information displayed on the time adjustment GUI 600 to determine whether to adjust the time at which the order is to be ready. The merchant can select a new ready time from the Adjust "Ready by" to pull-down list box 620 and then select the Save button 622 to save the new "Ready by" time. When the "Ready by" time is changed, the merchant can adjust a preparation time and sequence for the order so that the order is ready when the customer is expected to arrive at the merchant store.

FIG. 7 shows an example incoming customer database 700. The incoming customer database 700 includes columns for a user ID 702, a customer name 704, an item 706 that is ordered, a quantity 708 for the order, a loyalty level 710 for the customer, an estimated time of arrival (ETA) 712 for the customer at the merchant store, a user device clock 714, indicating a time at which the user placed the order, a habit 716, indicating an average amount of time that the user arrives early or late to pick up an order, a ready by 718 time at which the order is projected to be ready, a new ETA 720, representing an updated ETA based on any delays identified for the customer arrival time at the merchant store, a store 722, including a name and address of the merchant store, a user GPS 724, representing GPS coordinates for a location of the customer when the customer placed the order, a store GPS, representing GPS coordinates for a location of the merchant store and a transportation method 728, representing a method of transportation the customer is using to travel to the merchant store.

As an example of data stored in the incoming customer database 700 taken from the first row of the incoming customer database 700, customer John Doe, having a user ID of 008JB has placed an order for one meatball sub. The customer placed the order at 12:29 PM. The user has a customer loyalty level of 3, indicating, for this implementation, as discussed in more detail later herein, that the customer has ordered between 51 and 100 times from the merchant store. An estimated time of arrival for the user at the merchant store is calculated to be 12:35 PM. The user has a habit of on average being 5 minutes late when picking up orders at the merchant store. Therefore, the merchant has calculated a ready by time for order of 12:40 PM (adding 5 minutes to the ETA of 12:35 PM). A determination is made, based on an analysis of a current location of the user as the user travels to the merchant store, that the user is on schedule and not delayed. Therefore, a new ETA based on an updated ETA remains at 12:35 PM, the same as the original ETA 712. The first row of the incoming customer database 700 also shows that the merchant store is the Sandwich Hut at an address of 12 Main Street, the example user GPS coordinates are Xx1:yy1, the example merchant store GPS coordinates are Xx5:yy5 and the customer is walking to the merchant store. Similar examples are shown in the remaining rows of the incoming customer database 700.

Figure 8:
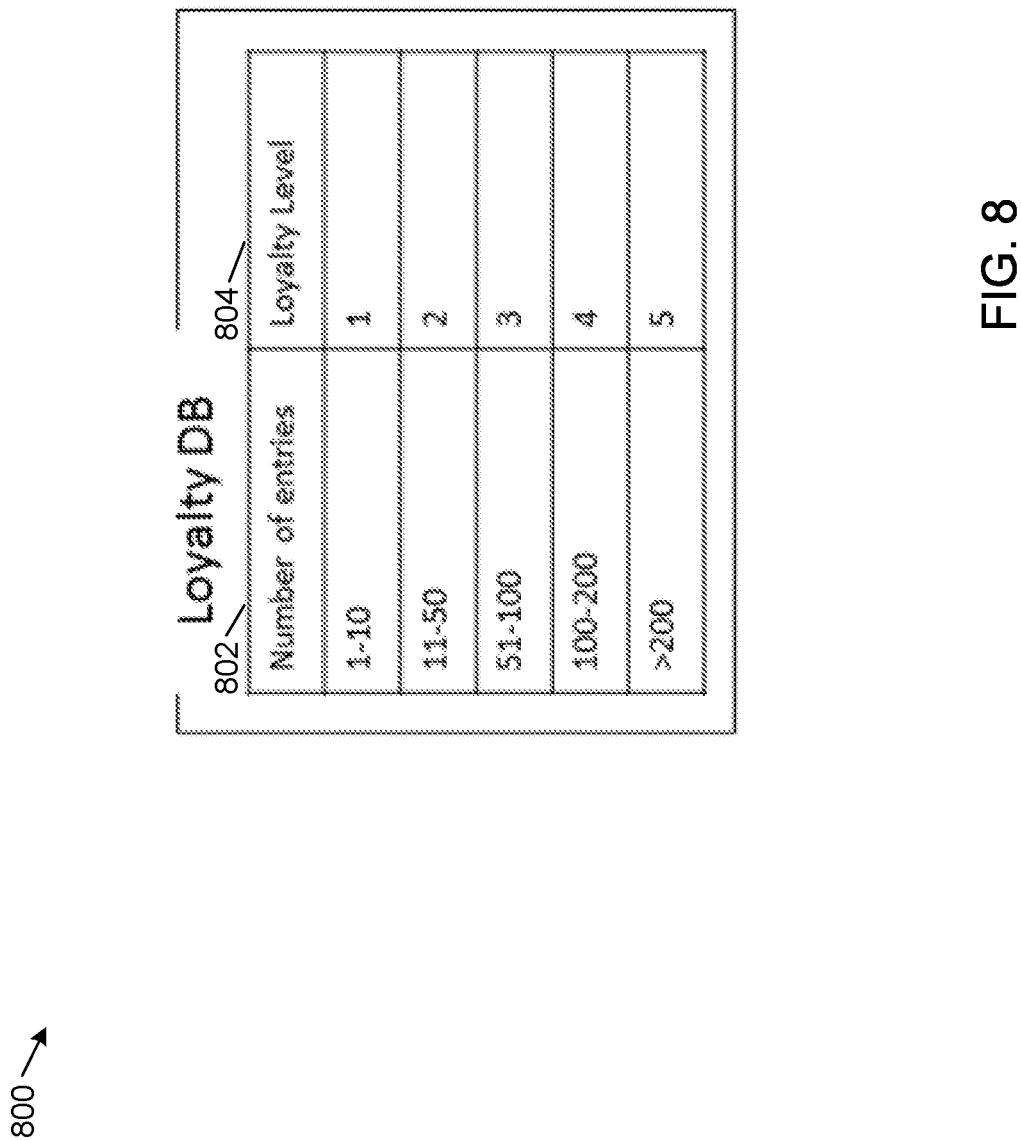
FIG. 8 shows an example loyalty database.

FIG. 8 shows an example loyalty database 800. The loyalty database 800 is a measure of a degree of loyalty the customer shows to the merchant store based on the number of times the customer has ordered from the merchant store. The loyalty database 800 includes a number of entries column 802 and a loyalty level column 804. The number of entries column 802 represents the number of times the customer has ordered from the merchant store. In an example implementation from loyalty database 800, when the customer has ordered between 1 and 10 times from the merchant store, the customer is assigned a loyalty level of 1, when the customer has ordered between 11 and 50 times from the merchant store, the customer is assigned a loyalty level of 2, when the customer has ordered between 51 and 100 times from the merchant store, the customer is assigned a loyalty level of 3, when the customer has ordered between 100 and 200 times from the merchant store, the customer is assigned a loyalty level of 4 and when the customer has ordered more than 200 times from the merchant store, the customer is assigned a loyalty level of 5. In other implementations, the number of entries corresponding to a particular loyalty level can be different.

As discussed earlier herein, the loyalty level for the customer is displayed on the merchant GUI (FIG. 5). A merchant employee can view the loyalty level, identify how loyal the customer has been and treat the customer accordingly. For example, the merchant employee can decide to move the customer up on a waiting line or provide a free extra (for example a cookie) with the customer order.

Figure 9:
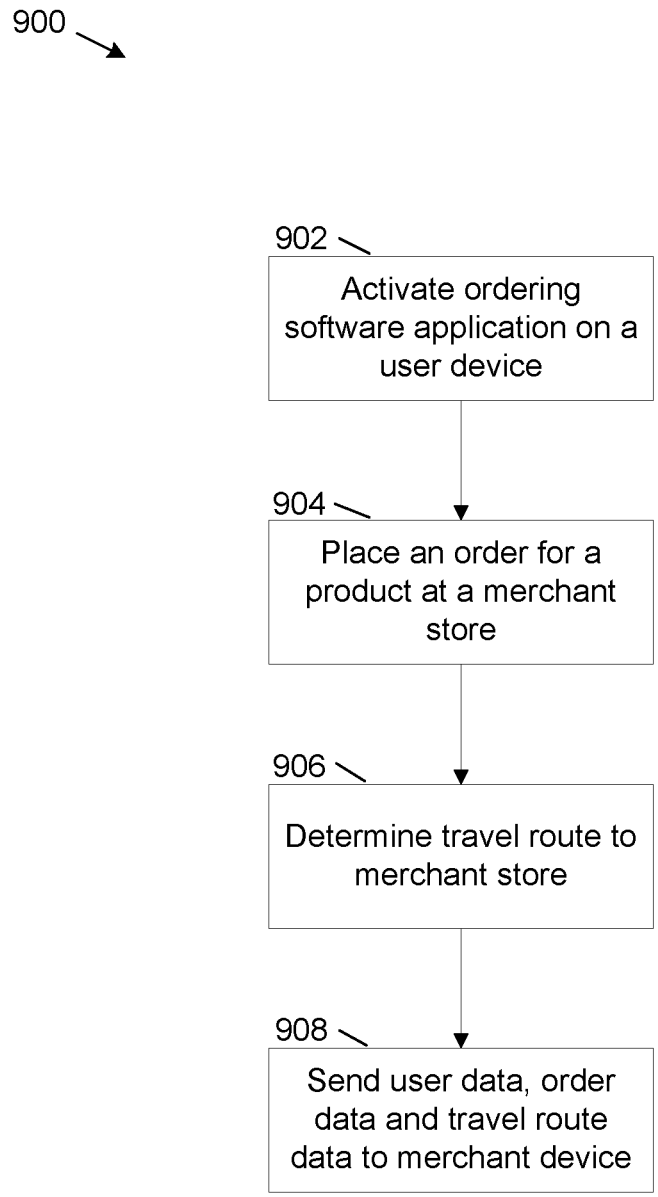
FIG. 9 shows an example method for placing a product order at a merchant store.

FIG. 9 shows a flowchart of an example method 900 for placing an order for a product at a merchant store using a software application on a user device such as a smartphone.

At operation 902, an ordering software application is activated on the user device. For this method, the user device is referred to as the smartphone. The ordering application permits a user of the smartphone to place an order for a product at the merchant store. The ordering software application can be activated by selecting an icon for the ordering software application on a display screen of the smartphone.

At operation 904, the user places an order for the product at the merchant store. For example, the user can select the product using a purchase GUI, similar to the purchase GUI shown in FIG. 3. A procedure for ordering the product using the purchase GUI is described in more detail later herein in a discussion of FIG. 10.

At operation 906, a travel route is determined for the user to travel from a current location of the user to the merchant store. The user can determine a method of transportation to travel to the merchant store using a GUI on the software application similar to the transportation method GUI of FIG. 4. A procedure for determining the travel route using the transportation method GUI is described in more detail later herein in a discussion of FIG. 11.

At operation 908, user data, order data and travel route data is sent to a merchant device. The merchant device is an electronic computing device used by the merchant store. The user data can include a user ID and a user name. The order data can include the item being ordered, the quantity of the item being ordered and a time at which the order is placed. The travel route data can include a current location and an estimated time of arrival for the user at the merchant store.

Figure 10:
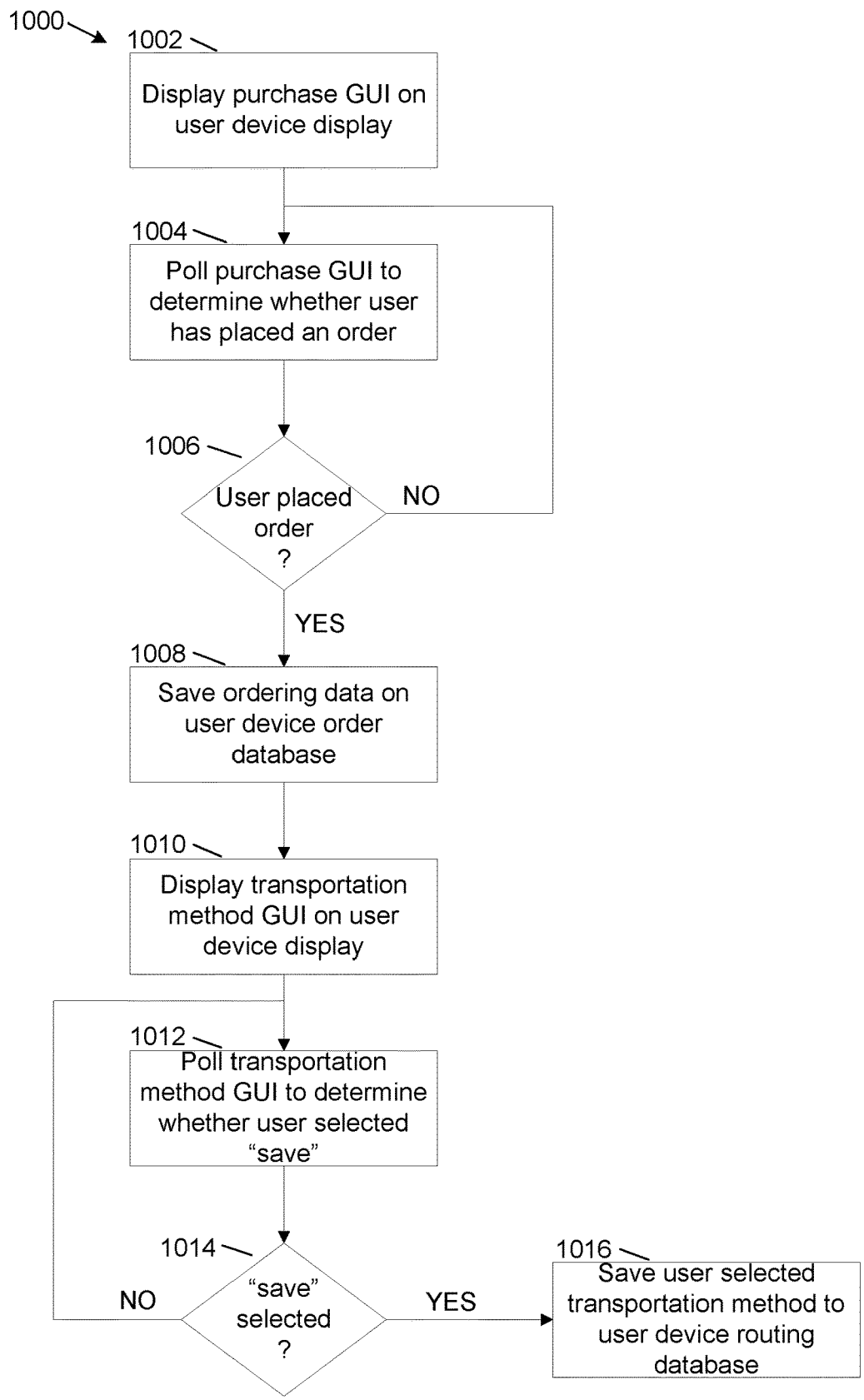
FIG. 10 shows another example method for placing a product order at a merchant store.

FIG. 10 shows a flowchart of an example method 1000 for using a purchase GUI on the smartphone to place an order for a product at a merchant store.

At operation 1002, the purchase GUI is displayed on a display screen of the smartphone. In an example implementation, the purchase GUI is installed as part of the ordering software application on the smartphone. In this implementation, the purchase GUI contains a list of available merchants from which to order products, a list of available products at the available merchants and a price for the products. In other implementations, the purchase GUI can include a list of available merchants and hyperlinks to display a user interface of an ordering website associated with an available merchant.

At operation 1004, the user device polls the purchase GUI to determine whether an order has been placed. At operation 1006, when a determination is made that an order has not been placed, control returns to operation 1004 and the user device is polled again.

At operation 1006, when a determination is made that an order has been placed, at operation 1008, ordering data is saved in the user device order database. The ordering data can include the time of the order, the item and quantity being ordered and the merchant store for the order.

At operation 1010, the transportation method GUI is displayed on the user device. The transportation method GUI permits the user to select a method of transportation to the merchant store. As shown in the example transportation method GUI of FIG. 4, the method of transportation can be one or walk, bike, bus, subway or car.

At operation 1012, the user device polls the transportation method GUI to determine whether the user has selected Save, Enter or something similar.

At operation 1014, when a determination is made that the user selected Save, at operation 1016, the selected method of transportation is saved to the user device routing database.

Figure 11:
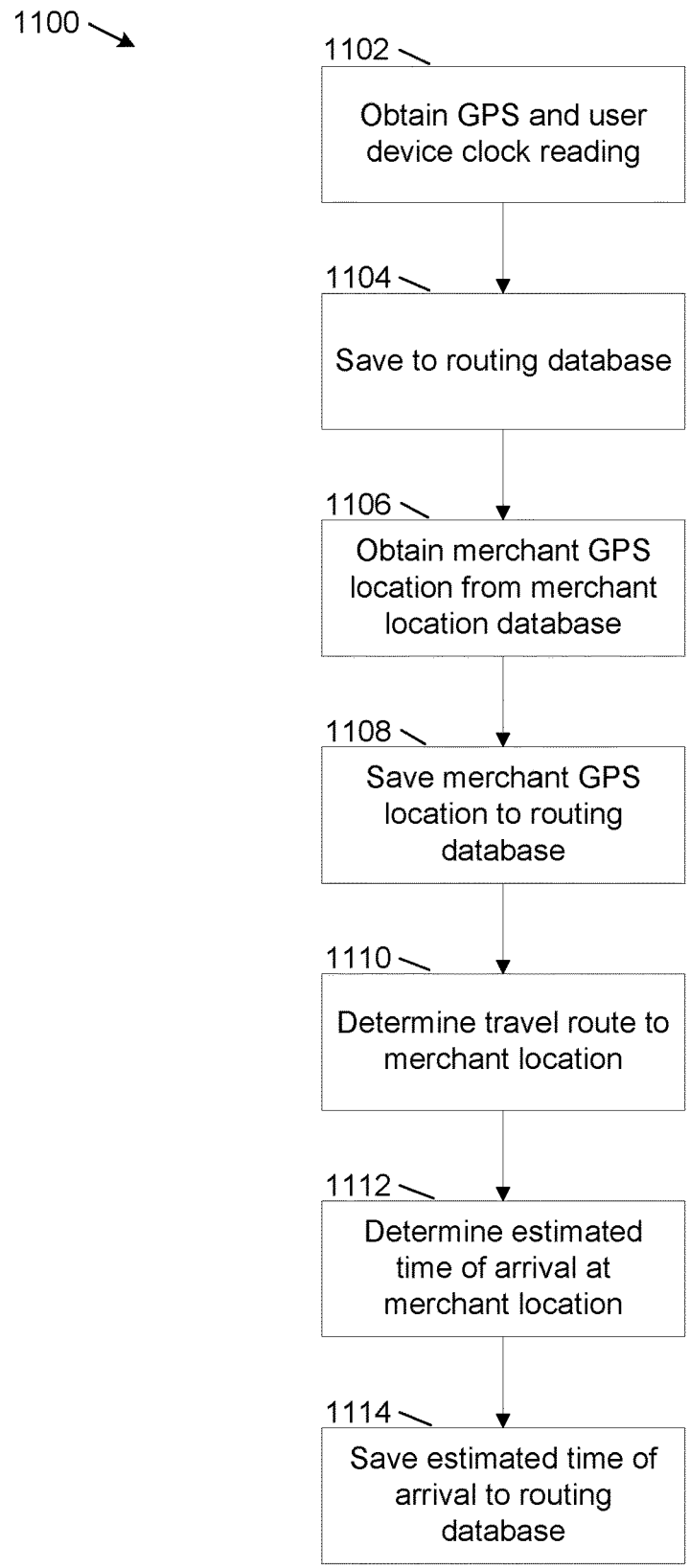
FIG. 11 shows an example method for determining an estimated time of arrival for a user at the merchant store.

FIG. 11 shows a flowchart of an example method 1100 implemented on the user device for determining an estimated time of arrival at the merchant store for the user.

At operation 1102, a current GPS location is obtained for the user and a device clock reading is obtained from the user's smartphone.

At operation 1104, the current GPS location for the user and the device clock reading are saved to a routing database on the smartphone.

At operation 1106, the GPS location of the merchant is obtained from a merchant location database, for example from merchant location database 118.

At operation 1108, the merchant GPS location is saved to a routing database on the smartphone.

At operation 1110, the ordering software application determines a travel route to the merchant store. The ordering software application uses the current GPS location of the user and the GPS location of the merchant store to determine the travel route to the merchant store.

At operation 1112, the ordering software application determines an estimated time of arrival (ETA) for the user at the merchant store. The ordering software application uses an average speed associated with the selected method of transportation to determine how long it would take for the user to reach the merchant store using the determined travel route.

At operation 1114, the ETA is saved to the routing database.

Figure 12:
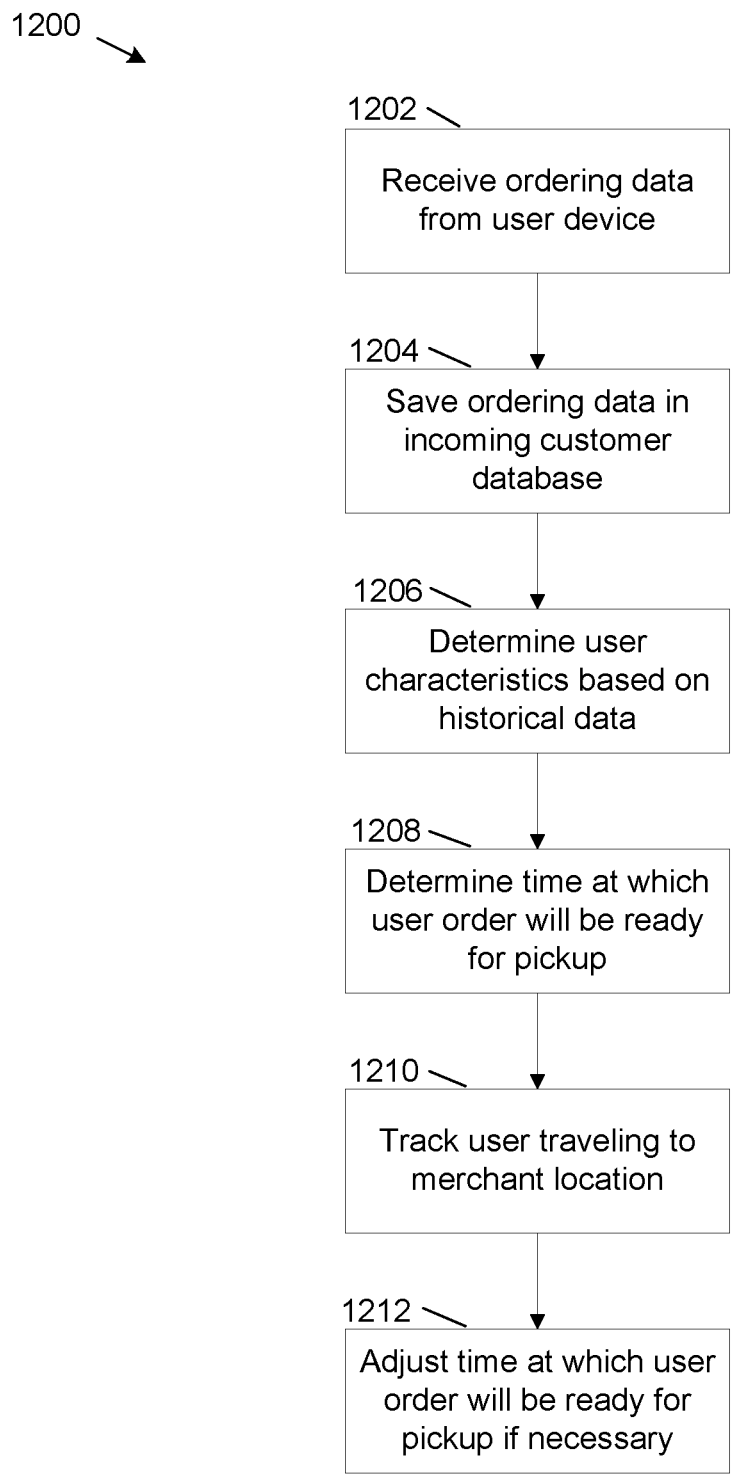
FIG. 12 shows an example method for scheduling preparation of a received order at the merchant store.

FIG. 12 shows a flowchart of an example method 1200 for scheduling the preparation of a received order at a merchant store. For method 1200, the order is sent from the smartphone of the user in a manner to that described in FIGS. 9-11.

At operation 1202 ordering data is received from the user's smartphone. As discussed, the ordering data can include the name and quantity of the item being ordered, a user ID and name of the customer who placed the order and a time at which the order was placed. The ordering data can also include travel route data including an estimated time of arrival for the user at the merchant store.

At operation 1204, the ordering data is saved in an incoming customer database on the merchant device.

At operation 1206, user characteristics are determined based on an evaluation of historical data for the user. The historical data can indicate how many times the user has ordered from the merchant and on average how early or late the user has been when picking up an order. The user characteristics that can be determined can include a loyalty level for the user and a habit for the user. The habit represents an average number of minutes the user has been early or late in the past when picking up an order. A more detailed procedure of how the user characteristics are determined is included later herein in regard to FIGS. 13-15.

At operation 1208, a time is determined at which the user order will be ready for pickup. The time at which the order is determined to be ready for pickup is based on how long it takes to prepare the order, where the user order is in a queue of other received orders and the estimated time of arrival for the user at the merchant store. Ideally, the time at which the user order is ready corresponds to the time that the user is estimated to arrive at the merchant store. A more detailed procedure of how the time that the order will be ready is determined is included later herein, in regard to FIG. 16.

At operation 1210, the user is tracked as the user travels to the merchant store. A more detailed procedure of how the user is tracked is included later herein, in regard to FIG. 17.

Figure 18:
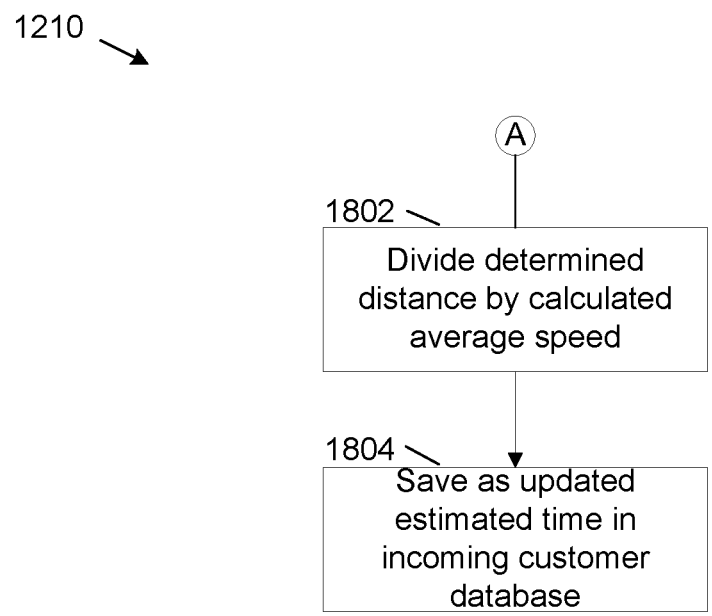
FIG. 18 shows another portion of the example method for tracking the user traveling to the merchant store of FIG. 17.

At operation 1212, if necessary, an employee of the merchant store adjusts the time at which the order will be ready. In this implementation, the time is adjusted if based on the tracking of the user in operation 1210, a determination is made that the user will be at least 5 minutes earlier or later than the previously received estimated time of arrival for the user. In other implementations, a threshold other than 5 minutes can be used for determining whether the estimated time of arrival for the user is to be adjusted. A more detailed procedure of how a determination is made as to whether the estimated time of arrival for the user should be adjusted is included later herein, in regard to FIGS. 18 and 19.

Figure 13:
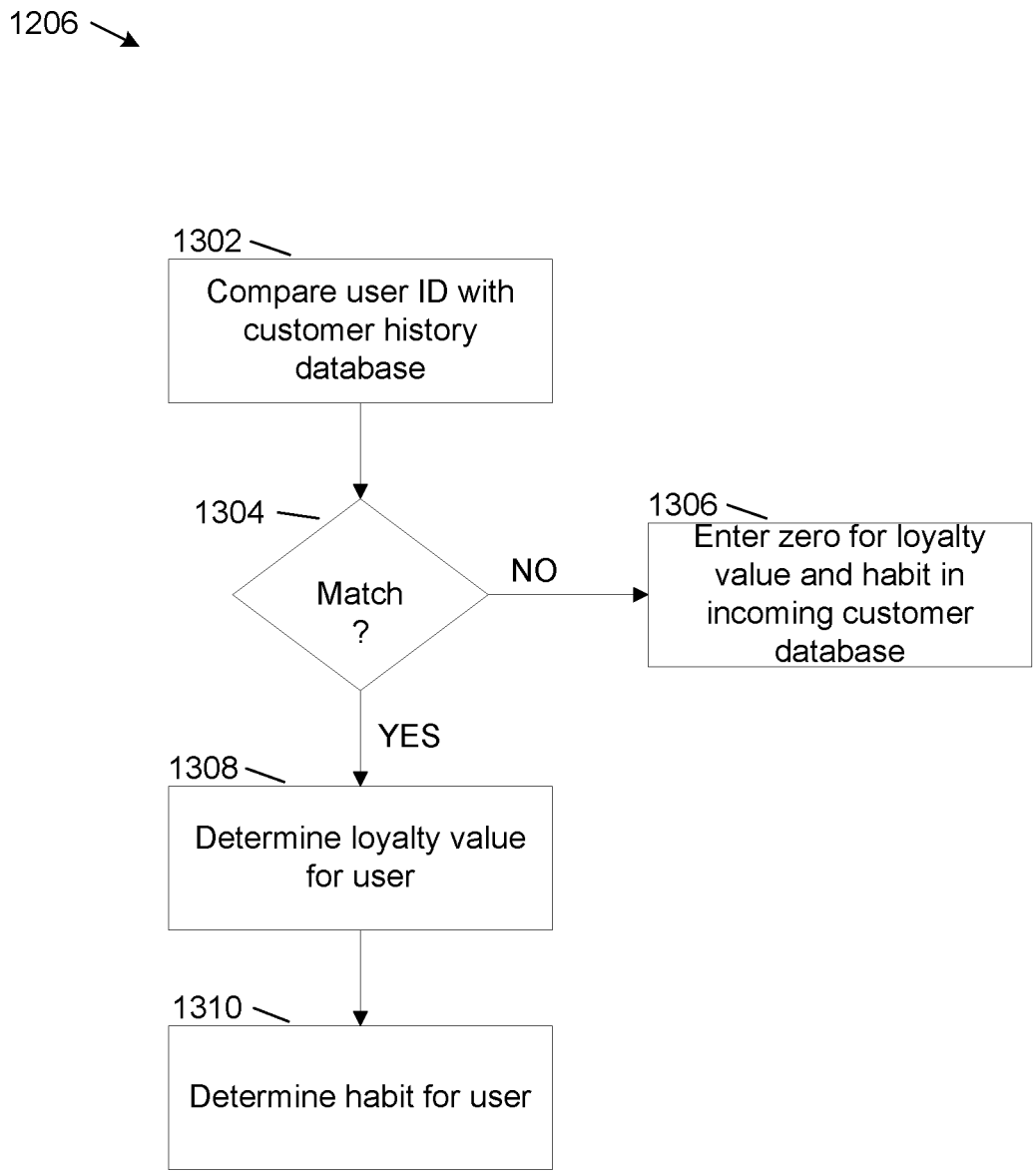
FIG. 13 shows an example method for determining user characteristics based on historical data.

FIG. 13 shows a flowchart for operation 1206 of method 1200 for determining user characteristics based on historical data.

At operation 1302, the user ID received in the ordering data from the smartphone is compared with other user IDs in a customer history database on the merchant device. The comparison is done to determine whether the user is a new customer or a repeat customer.

At operation 1304, when a determination is made that there is no match for the user ID in the customer history database, indicating that the user is a new customer, at operation 1306, a zero is assigned to both the loyalty value and the habit for the user in the incoming customer database.

At operation 1304, when a determination is made that there is a match for the user ID in the customer history database, indicating that the user is an existing customer, at operation 1308 a loyalty value is determined for the user and at operation 1310, a habit is determined for the user. The determination of the loyalty value is discussed in more detail in regard to FIG. 14 and the determination of the habit is discussed in more detail in regard to FIG. 15.

Figure 14:
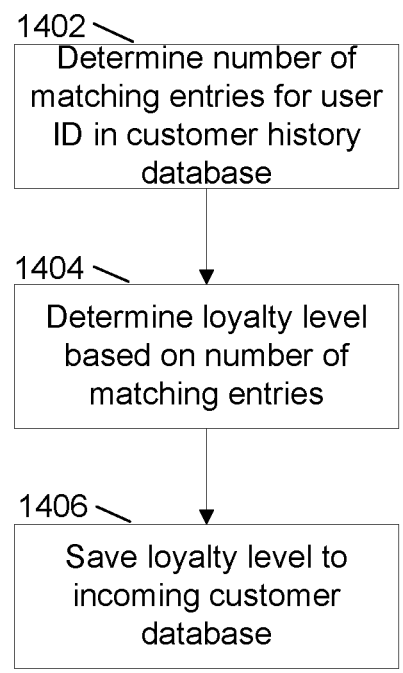
FIG. 14 shows an example method for determining a loyalty value for a user.

FIG. 14 shows a flowchart for operation 1308 of operation 1206 for determining the loyalty value for the user.

At operation 1402, a determination is made as to the number of matching entries for the user ID in the customer history database.

At operation 1404, the loyalty level for the user is determined based on the number of matching entries. For operation 1308, the loyalty database of FIG. 8 is used to determine the loyalty level. As discussed early herein with respect to FIG. 8, in this implementation the loyalty levels for a returning customer can range from 1 to 5.

At operation 1406, the loyalty level is saved to the incoming customer database.

Figure 15:
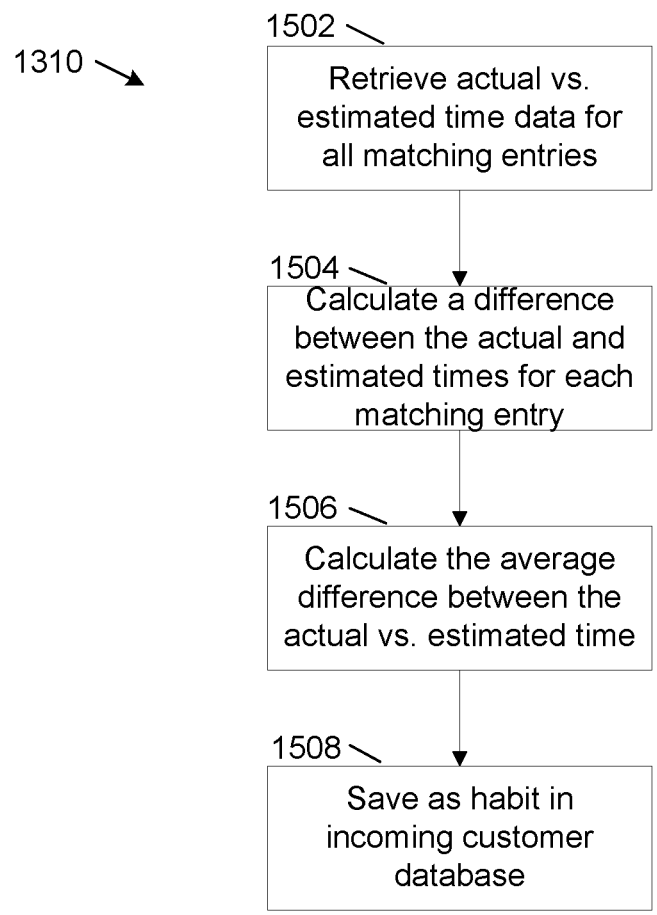
FIG. 15 shows an example method for determining a habit for a user.

FIG. 15 shows a flowchart for operation 1310 of operation 1206 for determining a habit for the user.

At operation 1502, estimated time of arrival data and actual time of arrival data are retrieved for all matching entries in the customer history database.

At operation 1504, a difference is calculated between the actual and estimated times for each matching entry for the user in the customer history database.

At operation 1506, an average difference is calculated between the differences of the actual and estimated times. The average difference represents an average time to which the user is early or late when arriving at the merchant store to pick up an order.

Figure 16:
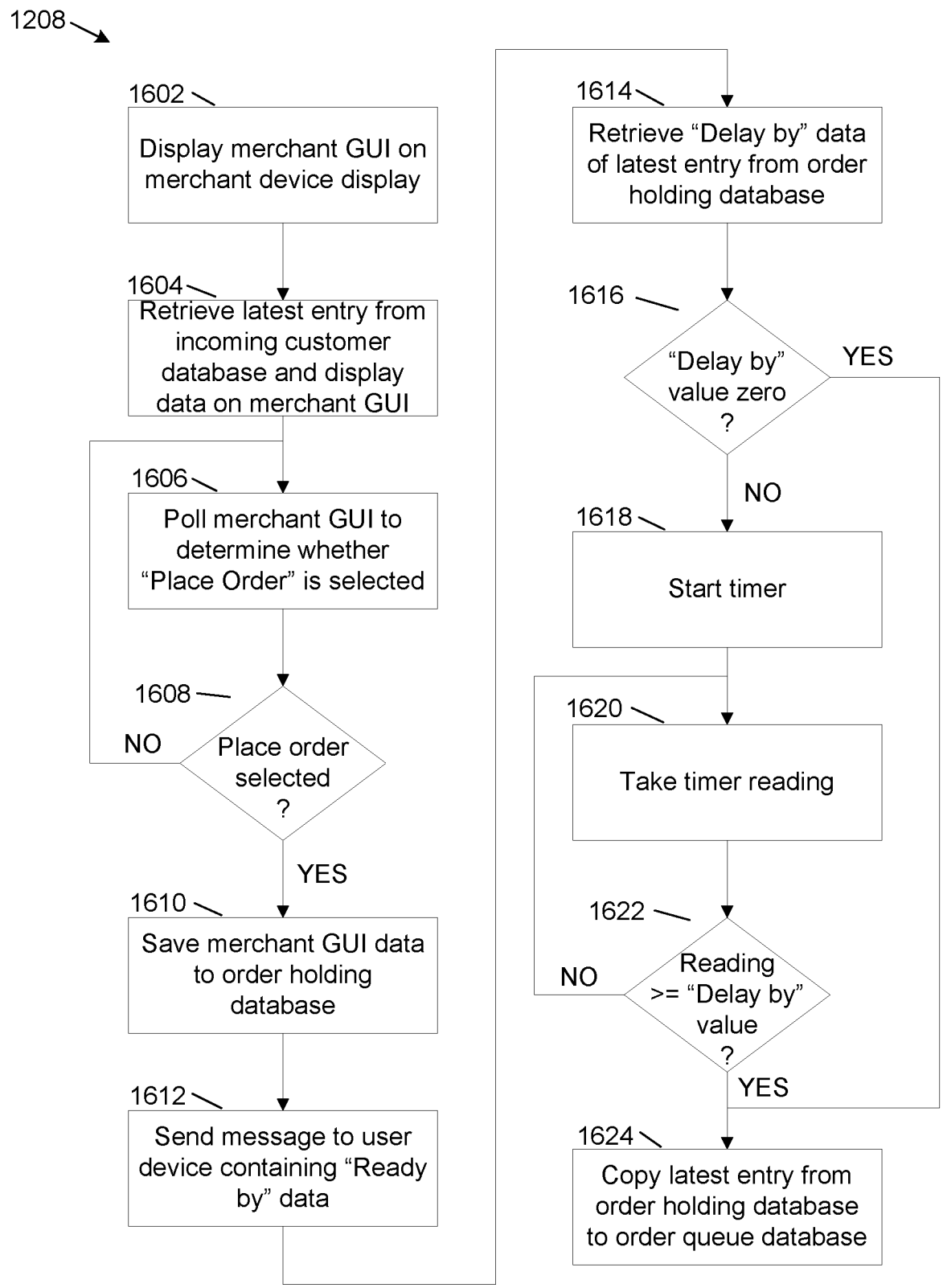
FIG. 16 shows an example method for determining a time at which an order will be ready for pickup.

FIG. 16 shows a flowchart for operation 1208 of method 1200 for determining a time at which the order will be ready for pickup.

At operation 1602, a GUI similar to the merchant GUI of FIG. 5, is displayed on the smartphone.

At operation 1604, data from the latest received entry from the incoming customer database (corresponding the to the customer order received at operation 1202), is displayed on the merchant GUI.

At operation 1606, the merchant device polls the merchant GUI to determine whether "Place Order" or a similar action is selected. The selection of "Place Order" or a similar action indicates that the merchant has placed an order at the merchant store to prepare the item specified in the order.

At operation 1608, when a determination is made that an order has been placed, at operation 1610 the merchant GUI data is saved to an order holding database on the merchant device.

At operation 1612, a message is sent to the user device specifying a time at which the order will be ready.

At operation 1614, "Delay by" data for the latest entry in the order holding database is received. The "Delay by" data specifies whether there is any delay associated with the order. A delay can occur, for example, when a determination is made that the user is delayed when traveling to the merchant store.

At operation 1616, a determination is made as to whether the "Delay by" value is zero. When a determination is made that the "Delay by" value is zero, control advances to operation 1624 where the latest entry from the order holding database is copied to the order queue database. When the latest entry is copied to the order queue database, an order corresponding to the latest entry is scheduled to be prepared based on the position of the order in the order queue.

At operation 1618, when a determination is made that the "Delay by" value is not zero, at operation 1618, a timer is started.

At operation 1620, a reading of the timer is taken.

At operation 1622, a determination is made as to whether the timer reading is greater than or equal to the "Delay by" value. When the timer reading is less than the "Delay by" value, control returns to operation 1620 and another reading of the timer is taken.

At operation 1622, when the timer reading is equal to or greater than the "Delay by" value, indicating that a specified delay time as passed, at operation 1624 latest order entry is copied from the order holding database to the order queue database. Preparation of the order will start when the order reaches the head of the order queue.

Figure 17:
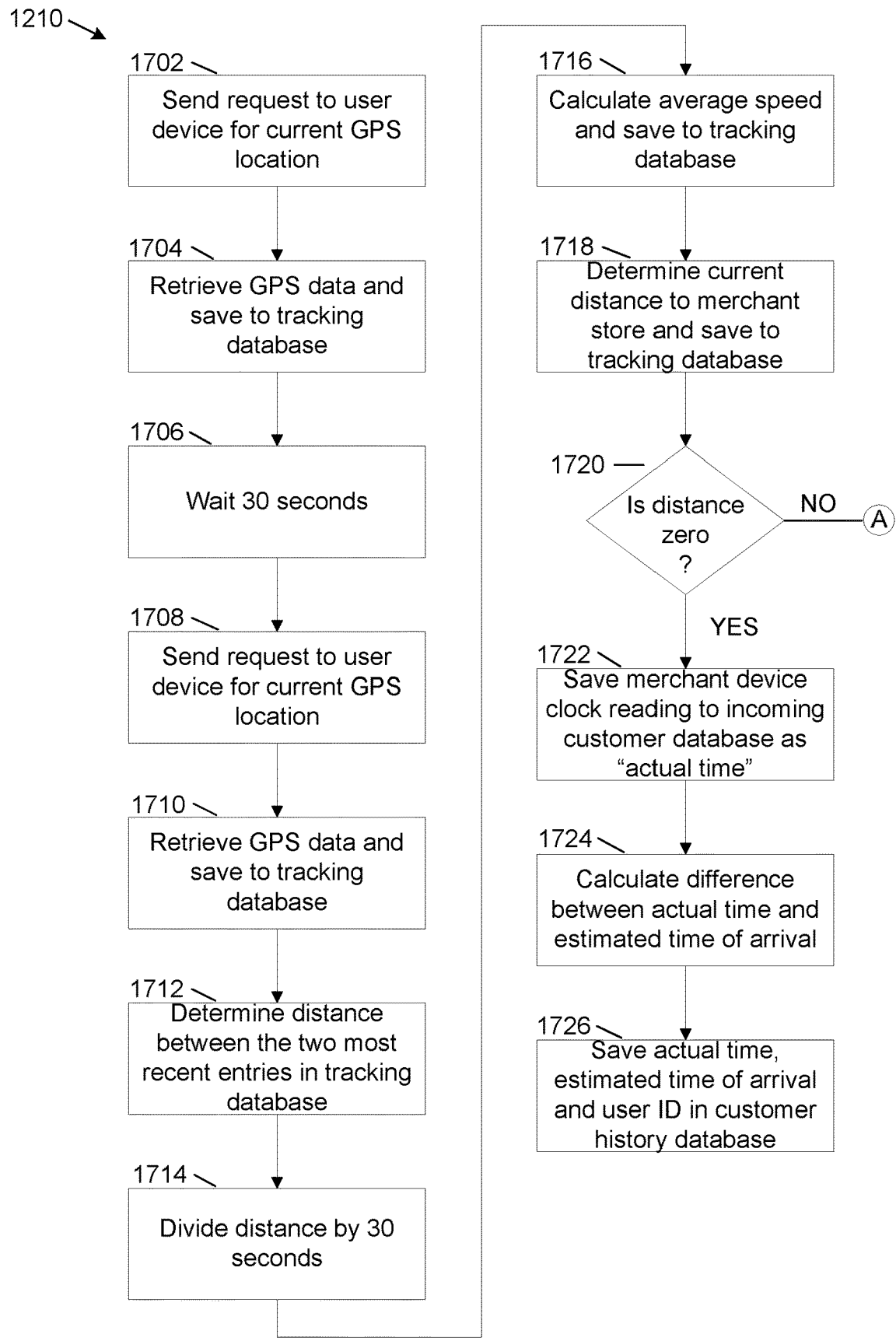
FIG. 17 shows a portion of an example method for tracking the user traveling to the merchant store.

FIG. 17 shows a flowchart for operation 1210 of method 1200 for tracking the user traveling to the merchant store.

At operation 1702, the merchant device sends a first request to the user device for a current GPS location of the user device.

At operation 1704, GPS data corresponding to the current location of the user is received at the merchant device and saved in a tracking database on the merchant device.

At operation 1706, a delay of 30 seconds is implemented.

At operation 1708, after the delay of 30 seconds, a second request is sent to the user device for a current GPS location of the user device.

At operation 1710, GPS data corresponding to the second request is received at the merchant device and saved in the tracking database.

At operation 1712, a distance is determined between the GPS locations of the user received after the first request and after the second request.

At operation 1714, the distance is divided by 30 seconds. The distance is divided by 30 seconds because the readings for the GPS locations were taken 30 seconds apart.

At operation 1716, an average speed of the user is calculated and saved to the tracking database. The average speed for the user is equal to the distance between the two GPS locations for the user divided by 30 seconds.

At operation 1718, a current distance to the merchant store is determined and saved to the tracking database. The current distance is based on the most current GPS location of the user.

At operation 1720, a determination is made as to whether the current user distance to the merchant store is zero.

At operation 1720, when a determination is made that the distance is zero, indicating that the user has arrived at the merchant store, at operation 1722, a current clock reading at the merchant device is saved to the incoming database as an actual time of arrival for the user.

At operation 1724, a difference is calculated between the actual time and the estimated time of arrival.

At operation 1726, the actual time of arrival, the estimated time of arrival and the user ID are saved in the customer history database.

At operation 1720, when a determination is made that the customer distance to the merchant store is not zero, indicating that the use has not yet arrived at the merchant store, at operation 1802, the current distance to the merchant store for the user is divided by the calculated average speed for the user. The result of the division represents an estimated time for how long the user still needs to travel to reach the merchant store. This estimated time is added to the current time to obtain an updated estimated time of arrival for the user.

At operation 1804, the updated estimated time of arrival for the user is saved in the incoming customer database.

Figure 19:
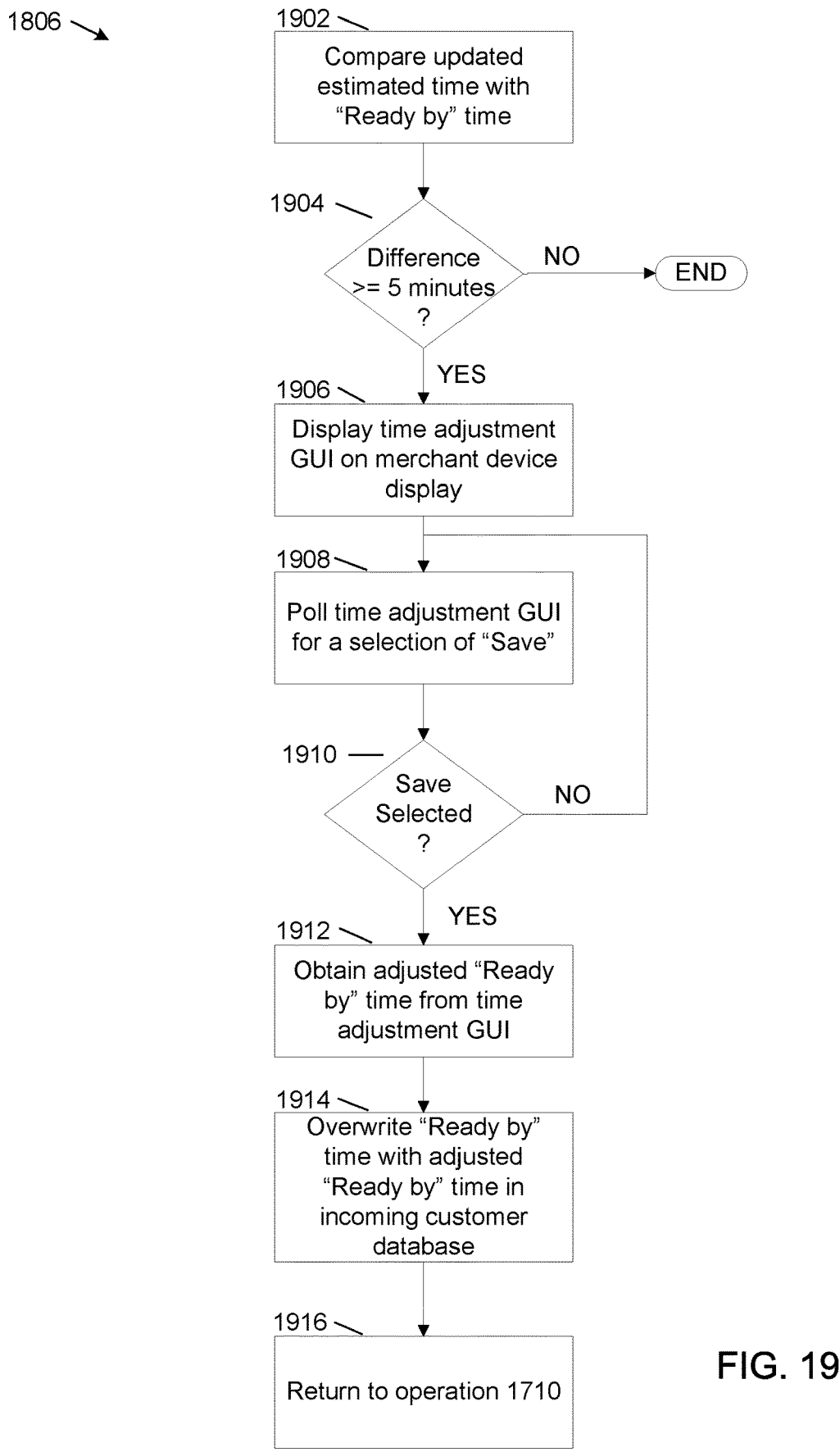
FIG. 19 shows an example method for adjusting a time at which the order will be ready for pickup.

FIG. 19 shows a flowchart for operation 1212 of method 1200 for adjusting the time at which the order will be ready for pickup, if necessary. In this implementation, the time is adjusted when the updated estimated time of arrival for the user from operation 1802 is at least 5 minutes different than a time at which the order is scheduled to be ready.

At operation 1902, a comparison is made between the updated estimated time of arrival and the "Ready by" time.

At operation 1904, a determination is made as to whether a difference between the updated estimated time of arrival and the "Ready by" time is greater than 5 minutes.

At operation 1904, when a determination is made that the difference is less than 5 minutes, no adjustment is made to the "Ready by" time.

At operation 1906, when a determination is made that the difference is greater than or equal to 5 minutes, at operation 1906, a time adjustment GUI is displayed on the merchant device. The time adjustment GUI is similar to the time adjustment GUI shown in FIG. 6.

At operation 1908, the time adjustment GUI is polled to determine whether a selection of "Save" (or a similar type of selection such as Enter) is made.

At operation 1910, when a determination is made that "Save" is not selected, control returns to operation 1908 and polling for "Save" continues.

At operation 1910, when a determination is made that "Save" is selected, at operation 1912, obtain an adjusted "Ready by" time from the time adjustment GUI. The adjusted "Ready by" time is manually entered by an employee of the merchant store based on a current "Ready by" time and the updated estimated time of arrival. For example, as shown in FIG. 6, when the current "Ready by"

time is 12:40 PM and the updated estimated time of arrival is 12:45 PM, the employee can adjust the "Ready by" time to 12:45 PM and select "Save."

At operation 1914, the time adjustment module 212 overwrites the "Ready by" time with the adjusted "Ready by" time in the incoming customer database.

At operation 1916, control returns to operation 1702 of FIG. 17 and, when the user still has not arrived at the merchant store, another request is made to the user device for the current GPS location of the user to continue to track the user as the user travels to the merchant store.

Figure 20:
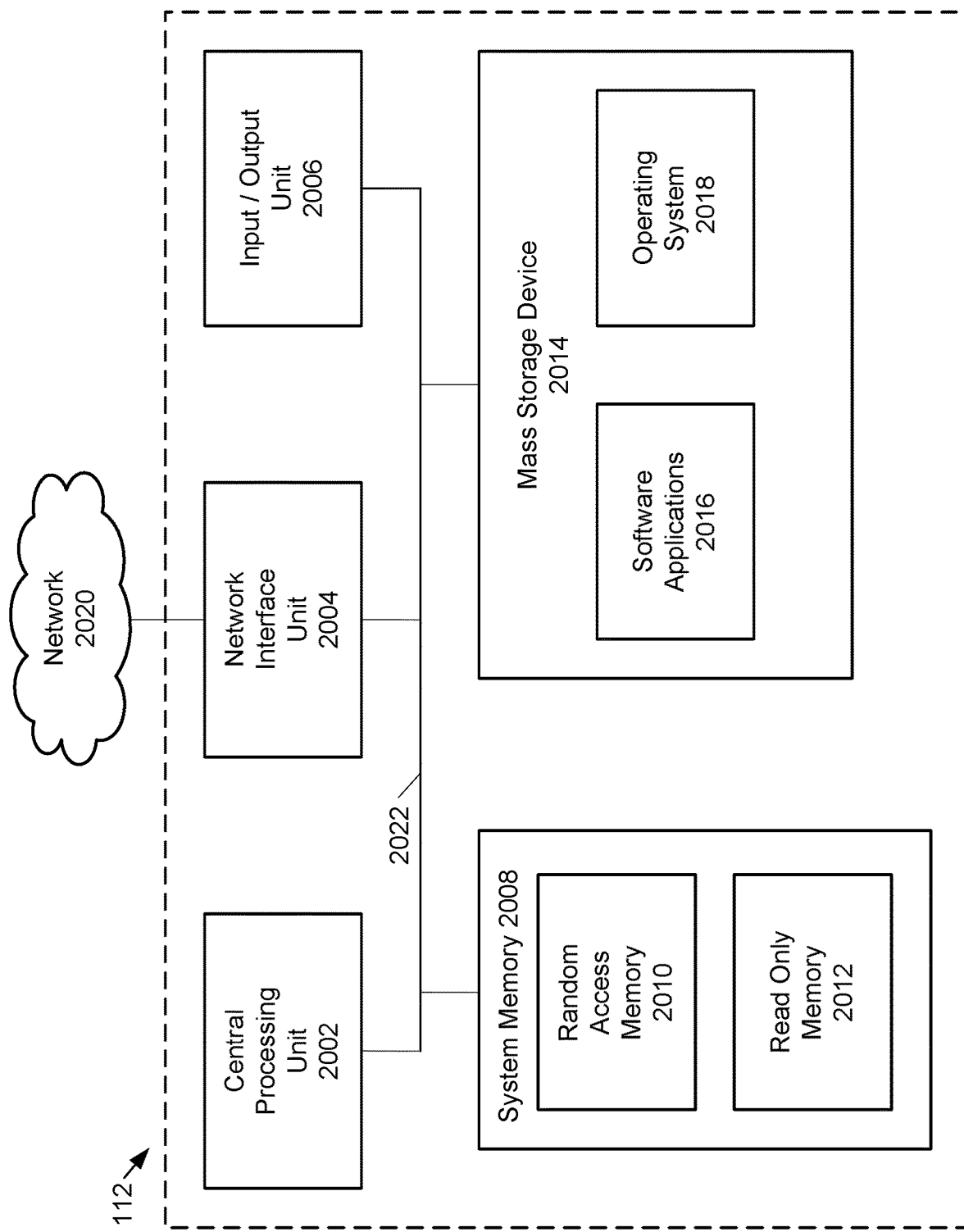
FIG. 20 shows example physical components of a merchant device of the system of FIG. 1.

As illustrated in the example of FIG. 20, merchant device 112 includes at least one central processing unit ("CPU") 2002, a system memory 2008, and a system bus 2022 that couples the system memory 2008 to the CPU 2002. The system memory 2008 includes a random access memory ("RAM") 2010 and a read-only memory ("ROM") 2012. A basic input/output system that contains the basic routines that help to transfer information between elements within the merchant device 112, such as during startup, is stored in the ROM 2012. The merchant device 112 further includes a mass storage device 2014. The mass storage device 2014 is able to store software instructions and data. Some or all of the components of the merchant device 112 can also be included in user device 102.

The mass storage device 2014 is connected to the CPU 2002 through a mass storage controller (not shown) connected to the system bus 2022. The mass storage device 2014 and its associated computer-readable data storage media provide non-volatile, non-transitory storage for the merchant device 112. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the merchant device 112.

According to various embodiments of the invention, the merchant device 112 may operate in a networked environment using logical connections to remote network devices through the network 2020, such as a wireless network, the Internet, or another type of network. The merchant device 112 may connect to the network 2020 through a network interface unit 2004 connected to the system bus 2022. It should be appreciated that the network interface unit 2004 may also be utilized to connect to other types of networks and remote computing systems. The merchant device 112 also includes an input/output controller 2006 for receiving and processing input from a number of other devices, including a touch user interface display screen, or another type of input device. Similarly, the input/output controller 2006 may provide output to a touch user interface display screen or other type of output device.

As mentioned briefly above, the mass storage device 2014 and the RAM 2010 of the merchant device 112 can store software instructions and data. The software instructions include an operating system 2018 suitable for controlling the operation of the merchant device 112. The mass storage device 2014 and/or the RAM 2010 also store software instructions, that when executed by the CPU 2002, cause the merchant device 112 to provide the functionality of the merchant device 112 discussed in this document. For example, the mass storage device 2014 and/or the RAM 2010 can store software instructions that, when executed by the CPU 2002, cause the merchant device 112 to display received data on the display screen of the merchant device 112.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented on an electronic computing device for managing a merchant queue, comprising:
   on the electronic computing device, receiving order data associated with a placed order and user data for a user from a user device, the order data including a selected method of transportation to a merchant store;
   receiving a first location of the user via a global positioning system (GPS) receiver of the user device as part of the user data to determine an estimated time of arrival for the user;
   waiting a predetermined period of time;
   receiving a second location of the user via the GPS receiver;
   calculating an average speed for the user;
   determining an updated estimated arrival time of the user at the merchant store to receive a completed order based on the average speed for the user;
   receiving user characteristics based on historical data associated with the user;
   receiving a placement of the placed order in a production queue based on the order data, and the user characteristics;
   automatically receiving an updated time at which the placed order is estimated to be ready based on changes to the user data, including the updated estimated arrival time of the user;
   comparing the updated estimated arrival time with the estimated time of arrival for the user, and when a difference between the updated estimated arrival time and the estimated time of arrival for the user is greater than a threshold, permitting a time at which the placed order is estimated to be ready to change; and
   providing a graphical user interface (GUI) on the electronic computing device to set the time at which the placed order is estimated to be ready, the GUI permitting an adjustment to the time the placed order is estimated to be ready based on the changes to the user data, and the GUI generating an alert when the time at which the placed order is to be ready has changed.

2. The method of claim 1, wherein the user characteristics include a determination of an average time duration the user is early or late when arriving at the merchant store to receive the completed order.

3. The method of claim 1, wherein the user data includes the estimated time of arrival for the user at the merchant store to receive the completed order.

4. The method of claim 3, wherein the placement of the placed order in the production queue is based on completing the placed order at or near the estimated time of arrival for the user at the merchant store.

5. The method of claim 1, wherein the graphical user interface displays at least part of the order data, the user data and the user characteristics.

6. The method of claim 5, wherein the graphical user interface displays the estimated time of arrival for the user at the merchant store and a number of minutes the user is typically early or late when picking up an order.

7. A method implemented on an electronic computing device for processing an order at a merchant store, the method comprising:
- on the electronic computing device, receiving order data and user data from a user device, the order data including a selected method of transportation for a user of the user device to travel to the merchant store;
- identifying the user associated with the order;
- receiving user characteristics based on historical data;
- receiving a first location of the user via a global positioning system (GPS) receiver of the user device as part of the user data to determine an estimated time of arrival for the user;
- determining a current distance of the user to the merchant store;
- determining an average speed of the user when traveling to the merchant store, the average speed being based on the method of transportation for the user;
- determining an updated estimated arrival time of the user at the merchant store to receive a completed order based on the current distance of the user to the merchant store, the average speed of the user, and a current time from the user device;
- using the order data, the user data, and the user characteristics, determining a time at which a user order based on the order data is estimated to be ready, so that the time at which the user order is estimated to be ready is approximately the same as the estimated time of arrival for the user at the merchant store;
- automatically receiving an updated time at which the user order is estimated to be ready to change based on a change to the user data, including the updated estimated arrival time of the user;
- comparing the updated estimated arrival time with the estimated time of arrival for the user, and when a difference between the updated estimated arrival time for the user and the estimated time of arrival for the user is greater than a threshold, permitting the time at which the user order is estimated to be ready to change; and
- providing a graphical user interface (GUI) to set the time at which the order is estimated to be ready, the GUI permitting an adjustment to the time the order is estimated to be ready based on the change to the user data, including:
  - displaying the time at which the user order is estimated to be ready and the updated estimated arrival time for the user,
  - generating an alert on the GUI when the time at which the user order is estimated to be ready has been updated, and
  - permitting a new value to be set for the time at which the order is estimated to be ready.

8. The method of claim 7, wherein the user data includes an identifier for the user, a current location for the user, and the current time of the electronic computing device.

9. The method of claim 7, wherein the order data includes the estimated time of arrival for the user at the merchant store.

10. The method of claim 7, wherein the user characteristics include a classification representing how often the user orders from the merchant store.

11. The method of claim 7, wherein the user characteristics include a value representing a number of minutes the user is on average early or late when picking up orders at the merchant store.

12. The method of claim 7, wherein the user characteristics include a loyalty level for the user.

13. An electronic computing device comprising:
- a processing unit; and
- a system memory, the system memory including instructions which, when executed by the processing unit, cause the electronic computing device to:
  - receive order data and user data for a user from a mobile electronic computing device, the order data including a first identifier for a product to be ordered at a merchant store, the user data including a second identifier for the user, a current location for the user, a selected method of transportation for the user to travel to the merchant store and a current time from the mobile electronic computing device, the selected method of transportation being one of a plurality of methods of transportation available for selection by the user, the plurality of methods of transportation including walking, biking, bus, subway, and car;
  - receive characteristics of the user based on historical ordering data for the user, the characteristics of the user including a classification representing how often the user orders from the merchant store and a value representing a number of minutes the user is on average early or late when picking up an order at the merchant store;
  - receive a current distance of the user to the merchant store via a global positioning system (GPS) receiver of the mobile electronic computing device;
  - receive an average speed of the user when traveling to the merchant store, the average speed being based on the selected method of transportation for the user;
  - based on the current distance of the user to the merchant store, the average speed of the user and the current time from the mobile electronic computing device, receive an estimated time of arrival at the merchant store for the user;
  - based on the order data, the user data, the estimated time of arrival at the merchant store for the user, and the number of minutes the user is on average early or late when picking up orders at the merchant store, receive a time at which a user order based on the order data is estimated to be ready, so that the time at which the user order is estimated to be ready is approximately the same as the time at which the user is estimated to arrive at the merchant store;
  - display a graphical user interface on a display area of the electronic computing device showing the time at which the order is estimated to be ready and to display the estimated time of arrival for the user;
  - automatically receive updates to the current location of the user;

calculate an updated estimated arrival time for the user at the merchant store based on the current location of the user;

compare the updated estimated arrival time with the estimated time of arrival for the user, and, when a difference between the updated estimated arrival time for the user and the estimated time of arrival for the user is greater than a threshold, permit the time at which the user order is estimated to be ready to change; and generate an alert on the display area of the electronic computing device showing the updated estimated arrival time for the user on the display area, wherein the graphical user interface permits the time at which the user order is estimated to be ready to be changed, based on the characteristics of the user.

\* \* \* \* \*